(12) United States Patent
Blau et al.

(10) Patent No.: US 11,325,085 B2
(45) Date of Patent: May 10, 2022

(54) DEVICE FOR CONVERTING A LINEAR MOVEMENT IN A STATIONARY SYSTEM INTO A ROTATIONAL MOVEMENT ABOUT A PIVOT AXIS IN A SYSTEM WHICH ROTATES ABOUT A ROTATIONAL AXIS

(71) Applicant: Maschinenfabrik Gustav Eirich GmbH & Co. KG, Hardheim (DE)

(72) Inventors: Simon Blau, Höpfingen (DE); Clemens Schmitt, Walldürn-Altheim (DE)

(73) Assignee: Maschinenfabrik Gustav Eirich GmbH & Co. KG, Hardheim (DE)

( * ) Notice: Subject to any disclaimer, the term of this patent is extended or adjusted under 35 U.S.C. 154(b) by 0 days.

(21) Appl. No.: 16/981,062

(22) PCT Filed: Mar. 8, 2019

(86) PCT No.: PCT/EP2019/055843
§ 371 (c)(1),
(2) Date: Sep. 15, 2020

(87) PCT Pub. No.: WO2019/175049
PCT Pub. Date: Sep. 19, 2019

(65) Prior Publication Data
US 2021/0023519 A1    Jan. 28, 2021

(30) Foreign Application Priority Data
Mar. 16, 2018  (DE) .................... 10 2018 106 188.9

(51) Int. Cl.
*B01F 35/30* (2022.01)
*B01F 29/83* (2022.01)
(Continued)

(52) U.S. Cl.
CPC .............. *B01F 35/30* (2022.01); *B01F 29/83* (2022.01); *B01F 35/451* (2022.01);
(Continued)

(58) Field of Classification Search
CPC .................. B01F 15/00435; B01F 9/12; B01F 15/00785; B01F 15/0267; B01F 15/0292;
(Continued)

(56) References Cited

U.S. PATENT DOCUMENTS 1,757,098 A    5/1930   Streich et al.
4,516,859 A *  5/1985   Spengler ........... B01F 15/00785
                                                       366/77

(Continued)

FOREIGN PATENT DOCUMENTS

DE    94 00 396 U1    4/1994
RU    2028523 C1    2/1995
(Continued)

OTHER PUBLICATIONS

Russian Office Action issued in related Russian patent application No. 2020130256 dated Nov. 24, 2021.

*Primary Examiner* — Charles Cooley
(74) *Attorney, Agent, or Firm* — Faegre Drinker Biddle & Reath LLP

(57) ABSTRACT

A conversion device for converting linear movement in a stationary system into rotary movement about a pivot axis in a system which rotates about an axis of rotation that is not identical or parallel to the pivot axis. The conversion device has a lift element and a lift device with which the lift element can be moved with translatory movement relative to the stationary system. The lift element has first and second lift element portions connected together by a rotary bearing so that the first lift element portion can be rotated relative to the second lift element portion about the axis of the rotary bearing. The first lift element portion is connected to the lift device and the second lift element portion is connected to the conversion device. The conversion device is connected to a shaft positioned on the pivot axis so that a linear movement (Continued)

of the second lift element portion is converted into a rotary movement of the shaft about the pivot axis.

11 Claims, 3 Drawing Sheets

(51) Int. Cl.
    *B01F 35/45*     (2022.01)
    *B01F 35/75*     (2022.01)
    *B01F 29/00*     (2022.01)
    *B01F 35/33*     (2022.01)
    *F16H 25/18*     (2006.01)

(52) U.S. Cl.
    CPC ........ *B01F 35/751* (2022.01); *B01F 35/7547* (2022.01); *F16H 25/18* (2013.01); *B01F 29/4032* (2022.01); *B01F 35/33* (2022.01)

(58) Field of Classification Search
    CPC .... B01F 2009/0061; B01F 2015/00623; B01F 9/0001; B01F 9/0016; B01F 2009/0065; B01F 2009/0069; B01F 35/30; B01F 29/83; B01F 35/451; B01F 35/751; B01F 35/7547; B01F 29/4032; B01F 35/33; B01F 29/4034; B01F 29/40351; B01F 29/10; B01F 29/31; F16H 25/18
    See application file for complete search history.

(56) References Cited

U.S. PATENT DOCUMENTS

| | | | | |
|---|---|---|---|---|
| 4,560,283 | A * | 12/1985 | Eirich | B01F 15/00805 366/188 |
| 4,854,715 | A * | 8/1989 | Eirich | B01F 13/06 366/139 |
| 4,998,678 | A * | 3/1991 | Durr | B02C 17/16 |
| 5,249,861 | A * | 10/1993 | Thomson | B01F 7/00925 366/194 |
| 10,632,434 | B2 * | 4/2020 | Veit | B01F 7/18 |
| 2016/0354743 | A1 * | 12/2016 | Veit | B01F 15/00785 |
| 2020/0023325 | A1 * | 1/2020 | Dorr | B08B 9/00 |
| 2021/0023519 | A1 * | 1/2021 | Blau | B01F 15/0292 |
| 2021/0245122 | A1 * | 8/2021 | Blau | B01F 7/18 |

FOREIGN PATENT DOCUMENTS

| | | | |
|---|---|---|---|
| RU | 2050961 C1 | 12/1995 | |
| WO | WO-2011/128435 A1 | 10/2011 | |
| WO | WO-2012/076705 A2 | 6/2012 | |
| WO | WO-2012/076705 A3 | 6/2012 | |
| WO | WO-2020201102 A1 * | 10/2020 | ........ B01F 15/00785 |

\* cited by examiner

DEVICE FOR CONVERTING A LINEAR MOVEMENT IN A STATIONARY SYSTEM INTO A ROTATIONAL MOVEMENT ABOUT A PIVOT AXIS IN A SYSTEM WHICH ROTATES ABOUT A ROTATIONAL AXIS

CROSS-REFERENCE TO PRIOR APPLICATIONS

This application is a § 371 National Stage Application of PCT International Application No. PCT/EP2019/055843 filed Mar. 8, 2019, which claims priority to German Application No. 10 2018 106 188.9 filed on Mar. 16, 2018, both of which are incorporated herein in their entirety.

TECHNICAL FIELD

The present invention concerns a device for converting a linear movement in a stationary system into a rotary movement about a pivot axis in a system rotating about an axis of rotation.

BACKGROUND

There are a large number of applications in which in a rotating system, an element rotating therewith is to perform a pivotal movement about a pivot axis, wherein the pivot axis does not extend on the axis of rotation and is also not parallel thereto. To produce the pivotal movement a suitable drive is required. In that case the drive can be provided in the rotating system so that it also rotates therewith. However the drive has to be supplied with power and in addition it requires space appropriately by virtue of the arrangement in the rotating system. Particularly when the drive is of a high mass or the rotating system rotates about the axis of rotation at high rotary speeds balancing elements are required under some circumstances to compensate for the weight of the drive.

An application by way of example is a mixer having a mixing container which rotates during the mixing process and in which the mixing material is accommodated. Such mixers frequently have eccentrically arranged mixing tools which themselves can again be rotated in operation. A closure cover is arranged in the bottom of the mixing container for emptying the mixer after the mixing operation has taken place. Such a mixer is known for example from WO 2011/128435 A1.

In the structure shown therein the closure cover is connected to a carrier arm by way of a mounting yoke and a mounting journal and can thus be pivoted about the tilt axis of the mounting journal. In such mixers the closure cover frequently terminates flush with the bottom of the container so that a flat bottom surface on which the mixing material is moved is formed. That ensures efficient thorough mixing of all the mixing material as there is no dead space above the closure cover, which is not reached by the mixing tool.

The requirement for the closure cover to end flush with the container bottom causes difficulties in terms of the design configuration and guidance of the closure cover.

Basically the closure cover would have to firstly be moved linearly downwardly to open the emptying opening. That however would have the result that, by virtue of the emptying opening being arranged in the bottom of the container, the mixing material would flow over all edge surfaces of the closure cover and possibly even contaminate the drive of the closure cover. Exclusively lateral pivotal movement of the closure cover out of the emptying opening is however not possible by virtue of the substantially cylindrical or frustoconical contact surfaces of the closure cover and the emptying opening.

For that reason the drive of the closure cover, that is disclosed in WO 2011/128435 A1, allows a pivotal movement both about the pivot shaft and also about the mounting journal. In the described embodiment the carrier arm is positioned in the stationary system while the closure cover rotates together with the container in the state of being fitted into the emptying opening. The closure cover is therefore mounted rotatably on the carrier arm.

In principle it would be advantageous if the closure cover has to be pivoted only about a pivot axis for opening or closing thereof. In order nonetheless to provide that it terminates flush in the bottom of the container the edge surfaces of the closure element would have to be of a curved configuration in such a way that they are on a notional sphere so that, for opening and closing the emptying opening, the closure element could be pivoted about its pivot axis extending through the centre point of the notional sphere.

In that case however it is not possible for the closure cover to be designed to rotate relative to a carrier arm. Instead the drive would have to be moved into the rotary system with the above-described disadvantages. Hitherto therefore the closure cover has not been implemented in the described form.

SUMMARY

The object of the present invention is therefore to provide a device for converting a linear movement in a stationary system into a rotary movement about a pivot axis in a system which rotates about an axis of rotation. An object of the present invention is also to provide a mixing device of the described kind, in which the closure cover can be pivoted about a pivot axis, wherein the drive for same is positioned in the stationary system.

According to the invention that object is attained by a conversion device of the described kind, which has a lift element, a lift device with which the lift element can be moved with a translatory movement relative to the stationary system, and a device for converting a linear movement into a rotary movement. In that case the lift element has a first lift element portion and a second lift element portion, wherein the two lift element portions are connected together by way of a rotary bearing in such a way that the first lift element portion can be rotated about the axis of the rotary bearing relative to the second lift portion, wherein the two portions of the lift element are connected together in positively locking relationship in the direction of the translatory movement of the lift device, and the first lift element portion is connected to the lift device while the second lift element portion is connected to the device for converting a linear movement into a rotary movement so that the device for converting a linear movement into a rotary movement is connected to a shaft positioned on the pivot axis in such a way that a linear movement of the second lift element portion is converted into a rotary movement of the shaft about the pivot axis.

Thus a lift device and a lift element are arranged in the stationary system. By means of the lift device the lift element can be linearly reciprocated between two positions, namely a lower position and an upper position. The terms 'lower' and 'upper' are randomly selected here. In principle instead of being in a vertical direction the movement of the lift device could also take place in a horizontal direction or in any other desired direction.

In a preferred embodiment the movement of the lift device is parallel to the axis of rotation of the rotating system.

The lift device is the drive in the stationary system, that can reciprocate only the lift element between two positions. The lift element itself comprises two portions, the first lift element portion and the second lift element portion. The first lift element portion is non-rotatably connected to the lift device. The second lift element portion is in turn connected to the first lift element portion by way of a rotary bearing so that the second lift element portion can be rotated relative to the first lift element portion about the axis of the rotary bearing. In a preferred embodiment the axis of the rotary bearing lies on the axis of rotation of the rotating system.

The result of the structure described hitherto is that the second lift element portion can rotate relative to the first lift element portion about the axis of rotation while at the same time the lift device can reciprocate the first lift element in the direction of the axis of rotation.

The second lift element portion is now connected to the device for converting a linear movement into a rotary movement. By virtue of the fact that the second lift element portion also reciprocates together with the first lift element portion in the direction of the axis of rotation by virtue of the positively locking connection to the first lift element portion this involves a linear movement of the second lift element portion. The device for converting a linear movement into a rotary movement is connected to the second lift element portion and is thus also in the rotating system. A shaft which is positioned on the pivot axis and which is connected to the device for converting a linear movement into a rotary movement is always rotated about the pivot axis when the lift device performs a linear movement.

A preferred embodiment provides that the lift device has at least one and preferably at least four lift pistons which connects the stationary system to the first lift element portion and can linearly move the first lift element portion relative to the stationary system.

In a further preferred embodiment the first and/or the second lift element portion are of an annular configuration. For example the second lift element portion can include a cylindrical discharge passage of a mixing container and rotate with same about the axis of rotation.

In a further preferred embodiment it is provided that the device for converting a linear movement into a rotary movement has a cam plate connected to the second lift element portion and a lever which is in contact with the cam plate and which is connected to a shaft arranged on the pivot axis.

It has been found that this embodiment is particularly practicable even if other devices for converting the translatory movement into a rotary movement like for example a gear-rack combination are conceivable.

In a further preferred embodiment there is provided a further device for converting a linear movement into a rotary movement, that is connected to the second lift element portion and a second shaft arranged on the pivot axis. In that way the shaft positioned on the pivot axis can be of a two-part structure to keep clear for example the opening region in which the pivot axis is disposed.

In regard to the mixing device the object set forth in the opening part of this specification is attained in that there is provided a mixing device having a container for receiving mixing material, that is rotatable about a container axis and in the bottom of which is arranged an emptying opening. The mixing device has a closure cover for closing the emptying opening and a mixer foot, the container being rotatable relative to the mixer foot. According to the invention there is now used a conversion device as just described, in which the mixer foot is part of the stationary system and the container is part of the rotating system, wherein the closure cover can be rotated about a pivot axis for opening and closing the emptying opening.

In a particularly preferred embodiment of the mixing device it has two devices for converting a linear movement into a rotary movement, which are both connected to the second lift element portion, wherein both are respectively connected to a shaft arranged on the pivot axis. In that way it is now possible for the closure cover to comprise two closure cover portions which can be reciprocatingly pivoted about a pivot axis relative to each other between a closed position in which the two closure cover portions are in contact and together form the closure cover and an opened position in which the two closure cover portions are spaced from each other so that an opening for removing the mixing material from the container is formed between the two closure cover portions in order to reciprocate them between the closed position and the opened position. In that case both closure cover portions are pivotable about the same pivot axis, wherein the one closure cover portion is connected to the device for converting a linear movement into a rotary movement and the other closure cover portion is connected to the further device for converting a linear movement into a rotary movement.

Advantageously the mixing device has a rotatable mixing tool arranged in the interior of the container. The closure element can have an inner surface which when the emptying opening is closed is arranged within the container, an outer surface which when the emptying opening is closed is arranged outside the container, and an edge surface which when the emptying opening is closed is arranged opposite an edge surface of the emptying opening.

In a preferred embodiment the closure element, the emptying opening and the pivot axis are of such a configuration and arrangement that a point arranged furthest from the pivot axis describes a circle on the inner surface or the edge surface of the closure element in the pivotal movement, wherein the closure element is arranged within the circle and the edge surfaces of the emptying opening are arranged outside the circle.

By virtue of that measure the closure element only has to be rotated about the pivot axis to close the emptying opening. The emptying opening is of such a configuration and arrangement that the edge surfaces of the emptying opening cannot collide with the closure element during the pivotal movement.

In principle a gap can remain between the edge surfaces of the closure element and the edge surfaces of the emptying opening even in the closed position of the closure element within the emptying opening. The gap width however should be less than the smallest grain size of the mixing material to be processed, to prevent the mixing material from flowing out of the mixing container in the closed position of the closure element.

A preferred embodiment provides that the emptying opening and the closure element have mutually corresponding edge surfaces which come into contact with each other when the closure element is positioned in the emptying opening.

That measure ensures that no gap remains between the emptying opening and the closure element in the closed position of the closure cover.

A further preferred embodiment provides that the edge surfaces of the closure element are of a curved configuration such that they lie on a notional sphere and the centre point of the notional sphere lies on the pivot axis.

Particularly preferably the closure element ends flush with the bottom so that a flat bottom surface is afforded when the closure element is positioned in the emptying opening.

Such a configuration of the edge surfaces is similar to the structure of spherical segment valve members. Spherical segment valve members serve as a shut-off member within dosing and feed lines. It will be noted however that in the case of the spherical segment valve members the movable valve members are of a spherical segment shape, that is to say not only the contact surfaces which come into contact with a corresponding valve seat are of a curved configuration, but the entire valve member is in the shape of a spherical cap. Apart from the fact that such a valve member is not to be viewed as a closure cover, it also does not permit a flat arrangement in the container bottom by virtue of the cap shape.

The configuration according to the invention has the advantage that the closure cover can be easily pivoted about the pivot axis to close or open the emptying opening.

BRIEF DESCRIPTION OF THE FIGURES

Further advantages, features and possible uses of the present invention will be apparent from the description hereinafter of a preferred embodiment and the associated Figures.

In the Figures.

DETAILED DESCRIPTION

Figure 1:
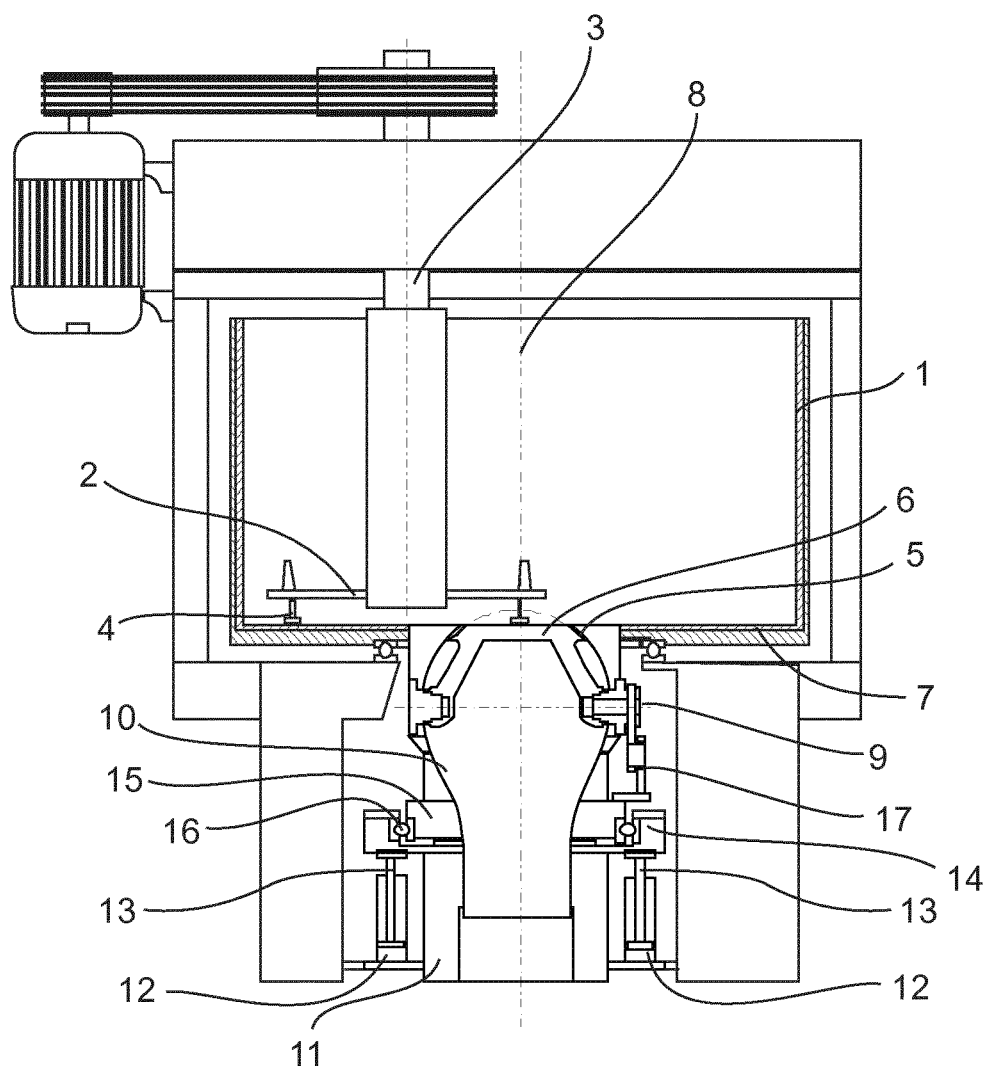
FIG. 1 shows a lateral section through a mixer with closure cover and device for operating the closure cover according to the present invention.

FIG. 1 shows a section through a mixer with a device according to the invention. The cylindrical mixing container 1 has a mixing tool 2 which is arranged eccentrically in the mixing container and which is supported in overhung relationship on a central mixer shaft 3 as well as a stationary wall/bottom scraper (not shown) mounted vertically in overhung relationship from above. Fixed to the lowermost plane of the mixing tool 2 are vertically downwardly projecting bottom blades 4 which operate at a small spacing relative to the surface of the container bottom.

The emptying opening 5 is in the centre of the mixing container 1. The emptying opening can be closed with the closure element in the form of a closure cover 6. The mixing container bottom 7 can be seen here.

The container bottom 7 rotates together with the container about an axis of rotation 8. The closure cover portion 6 is rotated about the pivot axis 9 for opening and closing the closure cover 6. So that this is possible the emptying opening and the closure cover portions preferably have mutually corresponding edge surfaces curved in such a way that they lie on a notional sphere so that, for opening or closing the emptying opening, the closure element portions can be pivoted about a pivot axis on which the centre point of the notional sphere lies.

In general disposed in the mixing container arranged above the mixing container bottom 7 is mixing material which, when the closure cover 6 is opened, falls into the mixing material discharge 10 through the emptying opening 5. The mixing material discharge 10 is connected to the container bottom so that same rotates with the container. Arranged on the mixing material discharge 10 is a skirt 11 connected to the stationary system. The mixing material discharge 10 and the skirt 11 are rotatable relative to each other by way of a rotary bearing 16.

A lift device 12, 13 is also arranged connected to the stationary system, that is to say for example in the mixer base, in which the corresponding mixer is positioned. In the illustrated example two lift stroke pistons 13 are arranged in the corresponding chambers within the piston housing 12. In per se known manner the fluid chambers formed by the lift pistons 13 can be acted upon with pressure fluid within the piston housing 12 in order to reciprocate the lift piston 13 within the housing 12 between its two extreme positions shown for example in FIGS. 2 and 3.

The lift piston 13 is connected to a first lift element portion 14. When the lift device 12, 13 is actuated the lift element portion 14 can be moved upwardly and downwardly together with the lift piston 13. The lift element comprises the first lift element 14 and the second lift element 15. The two lift element portions 14, 15 are rotatable relative to each other by way of a rotary bearing 16. As the first lift element 14 is fixed to the lift piston 13, that is arranged in the stationary system, that is to say it does not rotate together with the mixing container. The second lift element portion 15 in turn is connected to the mixing material discharge 10 so that it rotates together with same and the mixing container when the container is driven. The first lift element portion and the second lift element portion are so arranged that they are connected together in positively locking relationship in the direction of the linear movement of the lift device 12, 13, which means that, when the first lift element 14 is moved from the lower position shown in FIG. 2 into the upper position shown in FIG. 5, the second lift element portion 15 is also lifted.

Figure 2:
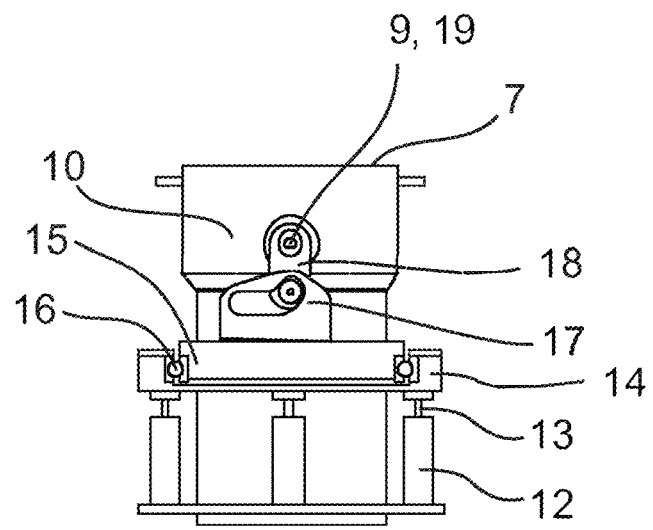
FIG. 2 shows a plan view of the closure region of FIG. 1.
Figure 3:
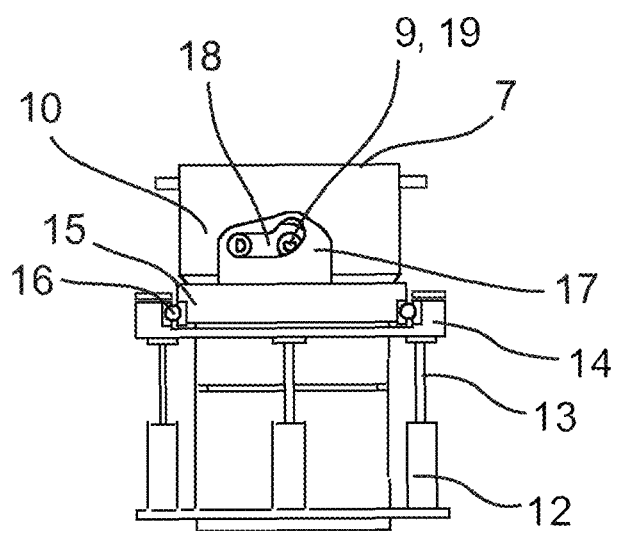
FIG. 3 shows a second plan view of the closure region of FIG. 1.

As can be seen in particular from FIGS. 2 and 3 a cam plate 17 is connected to the second lift element portion 15. A lever 18 runs on the cam plate, in turn being connected to the mixing container or the mixing material discharge 10. When now the lift device is actuated to move the lift element from the lower FIG. 2 position into the upper FIG. 3 position the lever 18 runs along the cam plate 17 and is rotated in the clockwise direction about the pivot axis 9. As the pivotal shaft 19 on the pivot axis 9 is connected to a closure cover 6 the latter is also rotated about the pivot axis 9.

Figure 4:
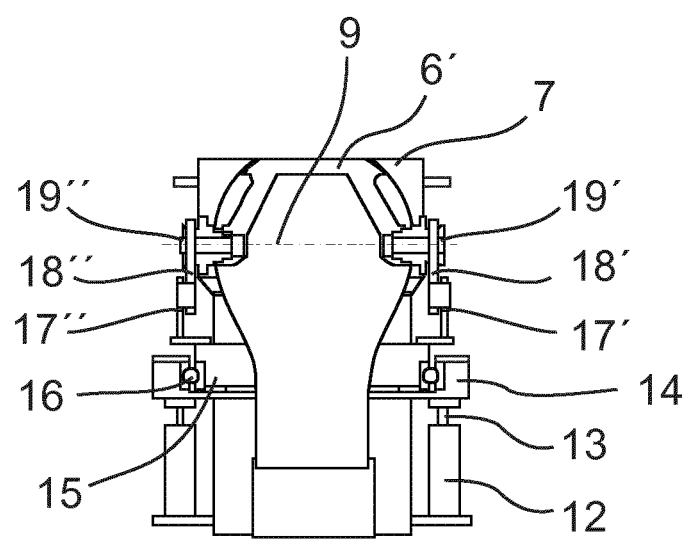
FIG. 4 shows a sectional view of the closure region of FIGS. 1 to 3 with a multi-part closure cover.

FIG. 4 shows a sectional view of the closure region of FIGS. 1 to 3 with a multi-part closure cover. In this case the second lift element portion 15 has two devices 17', 17" and 18', 18" for converting a linear movement into a rotary movement, that are both connected to the second lift element portion 15. Disposed in opposite relationship cam plates 17' and 17" are connected to the second lift element portion 15. The cam plates 17' and 17" are preferably identical for the mutually opposite movement of the closure cover portions 6' and 6" (not shown), that is to say they are not of a mirror-image symmetrical configuration. An appropriate lever 18' and 18" respectively runs in the cam plates, wherein both levers are respectively connected to a pivotal shaft 19' and 19" which is arranged on the pivot axis, the levers in turn being respectively connected to the closure cover portion 6' and 6" respectively associated with the pivotal shaft. In that way it is now possible for the closure cover to comprise two closure cover portions 6' and 6" which can be reciprocated relative to each other between a closed position and an opened position about a pivot axis to reciprocate them between the closed position and the opened position. In that arrangement both closure cover portions are pivotable about the same pivot axis 9, wherein the one closure cover portion 6' is connected to the device 17', 18', 19' for converting a linear movement into a rotary movement and the other closure cover portion 6" is connected to the further device 17", 18", 19" for conversion of a linear movement into a rotary movement. When using identical cam plates 17' and 17" the one pivotal shaft 19' then pivots in the clockwise direction while the second pivotal shaft 19" disposed on the same pivot axis 9 is moved in the anti-clockwise direction.

By virtue of the described conversion device it is possible in a simple fashion for a pivotal movement to be produced within a rotating system from a stationary system by means of a translatory movement.

LIST OF REFERENCES 1 mixing container
2 mixing tool
3 mixer shaft
4 bottom blade
5 emptying opening
6 closure cover
6', 6" closure cover portion
7 mixing container bottom
8 axis of rotation
9 pivot axis
10 mixing material discharge
11 skirt
12 piston housing
13 lift device
14 first lift element
15 second lift element
16 rotary bearing
17 cam plate
18 lever
19, 19', 19" pivotal shaft

The invention claimed is:

1. A conversion device for converting a linear movement in a stationary system into a rotary movement about a pivot axis in a system which rotates about an axis of rotation, wherein the pivot axis and the axis of rotation are not identical and do not extend parallel to each other, comprising a lift element, a lift device with which the lift element can be moved with a translatory movement relative to the stationary system, and a device for converting a linear movement into a rotary movement, wherein the lift element has a first lift element portion and a second lift element portion, wherein the two lift element portions are connected together by way of a rotary bearing in such a way that the first lift element portion can be rotated relative to the second lift element portion about the axis of the rotary bearing, wherein the two portions of the lift element are connected together in positively locking relationship in the direction of the translatory movement of the lift device, wherein the first lift element portion is connected to the lift device and the second lift element portion is connected to the device for converting a linear movement into a rotary movement, wherein the device for converting a linear movement into a rotary movement is connected to a shaft positioned on the pivot axis in such a way that a linear movement of the second lift element portion is converted into a rotary movement of the shaft about the pivot axis, wherein the device for converting a linear movement into a rotary movement has a cam plate connected to the second lift element portion and a lever which is in contact with the cam plate and which is connected to the shaft.

2. The conversion device according to claim 1, wherein the lift device has at least one lift piston which connects the stationary system to the first lift element portion and can linearly move the first lift element portion relative to the stationary system.

3. The conversion device according to claim 1, wherein the first and/or the second lift element portion is of an annular configuration.

4. The conversion device according to claim 1, wherein there is provided a further device for converting a linear movement into a rotary movement, that is connected to the second lift element portion and a second shaft arranged on the pivot axis.

5. The conversion device according to claim 4, wherein the two devices for converting a linear movement into a rotary movement are of such a configuration that the two shafts arranged on the pivot axis are moved in mutually opposite relationship.

6. The conversion device according to claim 1, wherein the pivot axis and the axis of rotation extend perpendicularly to each other.

7. A mixing device comprising
a container for receiving mixing material, which is rotatable about a container axis and in the bottom of which is arranged an emptying opening, a closure cover for closing the emptying opening and a mixer foot, the container being rotatable relative to the mixer foot; and
a conversion device for converting a linear movement in a stationary system into a rotary movement about a pivot axis in a rotating system which rotates about an axis of rotation, wherein the pivot axis and the axis of rotation are not identical and do not extend parallel to each other, comprising a lift element, a lift device with which the lift element can be moved with a translatory movement relative to the stationary system, and a device for converting a linear movement into a rotary movement, wherein the lift element has a first lift element portion and a second lift element portion, wherein the two lift element portions are connected together by way of a rotary bearing in such a way that the first lift element portion can be rotated relative to the second lift element portion about the axis of the rotary bearing, wherein the two portions of the lift element are connected together in positively locking relationship in the direction of the translatory movement of the lift device, wherein the first lift element portion is connected to the lift device and the second lift element portion is connected to the device for converting a linear movement into a rotary movement, wherein the device for converting a linear movement into a rotary movement is connected to a shaft positioned on the pivot axis in such a way that a linear movement of the second lift element portion is converted into a rotary movement of the shaft about the pivot axis, wherein the device for converting a linear movement into a rotary movement has a cam plate connected to the second lift element portion and a lever which is in contact with the cam plate and which is connected to the shaft,
wherein the mixer foot is part of the stationary system and the container is part of the rotating system, and
wherein the closure cover can be rotated about the pivot axis for opening and closing the emptying opening.

8. The mixing device according to claim 7, wherein the conversion device further includes a further device for converting a linear movement into a rotary movement that is connected to the second lift element portion and a second shaft arranged on the pivot axis, the closure cover comprises a first and a second closure cover portion which can be reciprocatingly pivoted about the pivot axis relative to each other between a closed position in which the first and the second closure cover portions are in contact and together form the closure cover and an opened position in which the first and the second closure cover portions are spaced from each other so that an opening for removing the mixing material from the container is formed between the first and the second closure cover portions in order to reciprocate them between the closed position and the opened position, wherein the first closure cover portion is connected to the device for converting a linear movement into a rotary movement and the second closure cover portion is connected to the further device for converting a linear movement into a rotary movement.

9. The mixing device according to claim 7, wherein the emptying opening and the closure cover have mutually corresponding edge surfaces which come into contact with each other when the closure cover is positioned in the emptying opening.

10. The mixing device according to claim 9, wherein the edge surfaces of the closure cover are of a curved configuration such that they lie on a notional sphere and the centre point of the notional sphere lies on the pivot axis.

11. The mixing device according to claim 7 the closure cover terminates flush with the bottom so that a flat bottom surface is afforded when the closure cover is positioned in the emptying opening.

* * * * *